United States Patent
Düringer

(10) Patent No.: US 6,936,198 B2
(45) Date of Patent: Aug. 30, 2005

(54) DEVICE AND METHOD FOR PRODUCING HOLLOW PLASTIC BODIES

(75) Inventor: Markus Düringer, Fussach (AT)

(73) Assignee: Soplar SA, Altstatten (CH)

( * ) Notice: Subject to any disclaimer, the term of this patent is extended or adjusted under 35 U.S.C. 154(b) by 480 days.

(21) Appl. No.: 10/203,931

(22) PCT Filed: Jan. 9, 2001

(86) PCT No.: PCT/CH01/00016
§ 371 (c)(1),
(2), (4) Date: Aug. 16, 2002

(87) PCT Pub. No.: WO01/62472
PCT Pub. Date: Aug. 30, 2001

(65) Prior Publication Data
US 2003/0011109 A1 Jan. 16, 2003

(30) Foreign Application Priority Data
Feb. 22, 2000 (CH) .................................. 337/00

(51) Int. Cl.⁷ .......................... B29C 49/30; B29C 49/78
(52) U.S. Cl. ..................... 264/40.1; 264/515; 264/536; 264/540; 425/140; 425/141; 425/535
(58) Field of Search ................................ 264/515, 540, 264/40.1, 536; 425/140, 141, 535

(56) References Cited

U.S. PATENT DOCUMENTS

| | | | |
|---|---|---|---|
| 4,695,340 A | | 9/1987 | Matuka |
| 4,871,492 A | | 10/1989 | Spoetzl |
| 4,923,385 A | * | 5/1990 | Spoetzl ...................... 425/522 |
| 5,245,770 A | | 9/1993 | Ko et al. |
| 5,316,709 A | | 5/1994 | Ko et al. |
| 5,849,342 A | * | 12/1998 | Uchiyama et al. .......... 425/525 |
| 6,238,200 B1 | * | 5/2001 | Spoetzl ...................... 425/525 |

FOREIGN PATENT DOCUMENTS

| | | |
|---|---|---|
| DE | 1933228 | 1/1971 |
| DE | 2711551 | 9/1978 |
| DE | 3003666 | 8/1981 |
| DE | 3629758 | 4/1987 |
| DE | 4123185 | 7/1990 |
| DE | 19732905 | 2/1999 |
| DE | 19846594 | 4/2000 |
| EP | 0373115 | 6/1990 |

* cited by examiner

Primary Examiner—Suzanne E. McDowell
(74) Attorney, Agent, or Firm—Burns, Doane, Swecker & Mathis, L.L.P.

(57) ABSTRACT

An apparatus for producing hollow bodies, in particular bottles and similar containers provided with an evacuation opening, of thermoplastic includes a lower machine part and a beamlike upper machine part. The lower machine part is equipped with at least two blow molds, each provided with a cavity. A number of blowing and calibration mandrels corresponding to the number of blow molds is disposed on the beamlike upper machine part disposed above the lower machine part. One blow mold is assigned to each blowing and calibration mandrel. The blowing and calibration mandrels can be axially fed jointly toward the blow molds and can be moved with their calibration region into an orifice of the cavity until an annular shoulder of the blowing and calibration mandrels comes into contact with a counterpart face on the associated blow mold. The blowing and calibration mandrels are retained axially freely movably, within predeterminable limits, in the upper machine part. Upon joint feeding of the blowing and calibration mandrels toward the blow molds, the blowing and calibration mandrels are automatically adjustable in height relative to their outset position, counter to the resistance of a coupling medium.

21 Claims, 2 Drawing Sheets

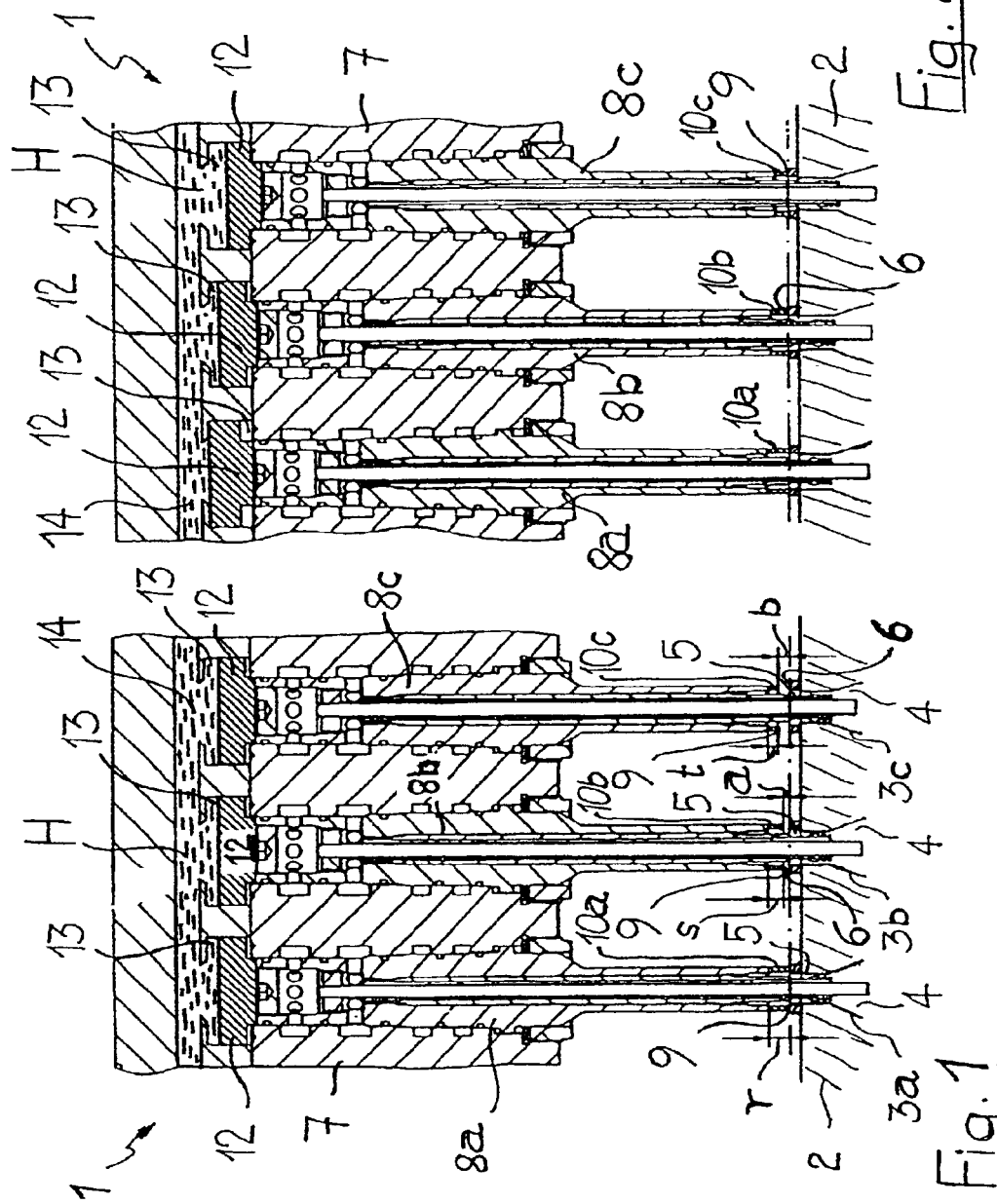

DEVICE AND METHOD FOR PRODUCING HOLLOW PLASTIC BODIES

RELATED APPLICATIONS

This application claims priority under 35 U.S.C. §§119 and 365 to Swiss application 337/00 filed in Switzerland on Feb. 22, 2000, and PCT/CH01/00016 filed as an International Application on Jan. 9, 2001, the entire contents of which are hereby incorporated by reference.

BACKGROUND

1. Field of the Invention

The invention relates to an apparatus for producing hollow bodies of thermoplastic. The invention also relates to a method for producing hollow bodies of a plastic in a hollow body blowing process.

2. Background Information

The containers of tinned sheet-iron or mixed sheet metal, glass, or ceramic that were typical in the past are increasingly being replaced with plastic containers. Especially for packaging fluid substances, such as beverages, oil, cleaning utensils, cosmetics, and so forth, plastic containers are used primarily. The low weight and lower costs surely play a not inconsiderable role in this substitution. The use of recyclable plastic materials and the overall more-favorable total expenditure of energy for producing them also contribute to increasing consumer acceptance of plastic containers, especially plastic bottles.

The production of plastic containers, especially plastic bottles, is done by extrusion blowing, in particular hollow body blowing, for instance tubular film blowing. In this process, a preform such as a tube, extruded in a single layer or multiple layers, is placed in blow molds, inflated by overpressure via a blow mandrel, and hardened by cooling. The automatic blow molder used for this purpose as a rule has a plurality of parallel-connected blow molds, which make it possible to produce a plurality of plastic containers simultaneously in one operation. Each blow mold is assigned a separate blow mandrel, which can be put into position in a way suitable for the process.

In many cases, hollow plastic bodies, such as bottles or canisters, but also industrial parts, have one or more openings, which are for a particular purpose in later use. Often such openings are embodied such that they are closable by suitable closing devices. These can for instance be screw closures or snap closures. An essential demand the closing technology must meet is tightness to liquids, gases and solids in powdered or granular form. In plastic packages, the tightness is typically achieved by creating smooth, dimensionally accurate sealing faces adapted to one another in both the hollow body and the closure. It is known that the sealing quality can be improved still further by the choice of the correct combination of materials for the hollow body and the closure.

Producing openings designed in this way typically is done simultaneously with the process of producing the hollow body. In it, the opening for introducing the inflation medium that generates the overpressure, which in most cases is compressed air, is designed at the same time such that it also meets the later demands made in terms of the use of the hollow body. In these cases, the sealing faces, which can be present both on the end face and on the preferably cylindrical or conical inner wall of a neck extending around the edge of the opening, must be produced. This is done in a so-called calibration operation, that is, by means of a dimensional adaptation of a portion of the blow mandrel, acting as a calibrating device, with the orifice region of the blow molds and with the predetermined wall thickness of the preform placed in the blow molds. The blowing and calibration mandrel furthermore has the task of pinching off process-created protruding parts of the preform in the upper edge region of the orifice, except for a minimal residual thickness of the hollow body, so that they can be pinched off perfectly in a deburring process following the inflation operation.

For both operations, that is, calibrating the opening and pinching off protruding parts, it is necessary for the blowing and calibration mandrel to assume a very accurate, replicable position in three planes relative to the orifice of the blow mold. In particular, the axis of the blowing and calibration mandrel must match the axis of the orifice of the cavity in the blow mold; the cutting ring face of the blowing and calibration mandrel must be parallel to the neck blade face of the blow mold, and the terminal height position of the blowing and calibration mandrel relative to the orifice of the blow mold must always assume exactly the position in which not only the dimensional tolerances of the finished hollow body are adhered to but also the pinching off of the protruding parts is assured. In practice, this is achieved by adjusting a mechanical end stop for the blowing and calibration mandrel. The adjustment is done manually, in accordance with a visual assessment of the pinching-off operation and dimensional checking of the orifice of the hollow body by the operator or operators. In a single blowing device that has only a single blowing and calibration mandrel, both demands in terms of quality can still be met relatively simply and simultaneously with regard to the opening and to the protruding parts. In automatic blow molders with a plurality of parallel blow molds and blowing and calibration mandrels associated with them, however, the adjusting operation can be accomplished only with great difficulty and is very time-consuming. In view of the demands for quality made of the pinching-off operation, the individual blowing and calibration mandrels must all be adjusted to the correct height relative to the orifices of the cavities in the blow molds. In this respect it must be noted that dimensional differences at the orifices of the individual blow molds, already dictated by the usual production tolerances or by wear, make different height adjustments of the blowing and calibration mandrels unavoidable. Because of the risk of injury to the operator, the mechanically cooperating components of these multiple automatic blow molders are protected against unauthorized or unintentional access by covering devices. However, these protective structural provisions are an obstacle to practicable adjustment, which should advantageously be done with the machine running.

SUMMARY OF THE INVENTION

It is an object of the present invention to overcome disadvantages of the apparatuses in the prior art. An apparatus for producing hollow bodies of plastic is to be created in which the adjustment operations are simplified, and safe, malfunction-free production of hollow bodies, especially plastic bottles and similar containers, of the desired quality is made possible.

These objects are attained in an apparatus and method for producing hollow bodies of thermoplastic.

An apparatus for producing hollow bodies, in particular bottles and similar containers provided with an evacuation opening, of thermoplastic includes a lower machine part and a beamlike upper machine part. The lower machine part is equipped with at least two blow molds, each provided with a cavity. A number of blowing and calibration mandrels corresponding to the number of blow molds is disposed on the beamlike upper machine part disposed above the lower machine part. One blow mold is assigned to each blowing and calibration mandrel. The blowing and calibration mandrels can be jointly fed axially toward the blow molds and can be moved with their calibration region into an orifice of the cavity until an annular shoulder of the blowing and calibration mandrels comes into contact with a counterpart face on the associated blow mold. According to exemplary embodiments of the invention, the blowing and calibration mandrels are retained axially freely movably, within predeterminable limits, in the upper machine part. When the blowing and calibration mandrels are fed jointly toward the blow molds, the blowing and calibration mandrels are automatically adjustable in height relative to their outset position, counter to the resistance of a coupling medium.

Because the blowing and calibration mandrels are supported limitedly axially adjustably in the upper machine part and are automatically adjustable in height upon being fed toward the blow molds, the tedious process of performing the adjustment manually can be dispensed with. By the self-adjustment of the blowing and calibration mandrels, it is assured that the encompassing annular shoulders on all the blowing and calibration mandrels are pressed with the same pressing force against the associated counterpart faces on the blow molds. Thus to assure clean pinching off of material protruding from the preform, only the feeding device has to be set up once and for all, for all the blowing and calibration mandrels. The self-adjustment of the blowing and calibration mandrels takes place automatically, counter to the restoring force of coupling media. Once adjusted automatically with respect to height, the mount of the blowing and calibration mandrels assures that the correct adjustment is maintained. On the other hand, the holding force of the mounts does not hinder an automatic readjustment, for instance required because of gradual wear to the cooperating faces that occurs during long-term operation. As an additional effect of the somewhat elastic adjustability, damping of the feeding operation ensues, which has advantages in terms of wear of the cooperating annular shoulders and counterpart faces.

In an advantageous variant of the invention, the blowing and calibration mandrels are coupled hydraulically to one another. By the hydraulic coupling of the blowing and calibration mandrels, the pressure compensation and the height adjustability of the blowing and calibration mandrels can be regulated quite simply. The hydraulically coupled blowing and calibration mandrels cooperate with adjusting pistons, which are limitedly displaceable axially inside bores in the upper machine part. The pistons are short-circuited to one another by means of a hydraulic fluid, which forms the coupling medium and is disposed inside a reservoir that communicates with the bores. As a result of the disposition according to the invention, all the blowing and calibration mandrels communicate with one another via a communicating vessel. From the moment a reaction force takes effect onward, an equalization of height occurs, until all the blowing and calibration mandrels exert the same force on a part to be pinched off. For instance, standard hydraulic oil is used. A degassing device for the hydraulic oil may be provided. When the hydraulic oil is dispensed in the exclusion of air after prior evacuation of the system, then a degassing device can be omitted.

To take appropriate account of the usual production tolerances, wear, and the requisite variously high cutting devices for various materials, the self-adjusting blowing and calibration mandrels have an axial height adjustability relative to their outset position that can amount for instance to about 4 mm, and in a variant of the invention preferably about 2.5 mm. Naturally, still greater axial adjustment ranges can also be provided.

For reasons of assembly technology and because of simple maintenance, the blowing and calibration mandrels are retained releasably in the beamlike upper machine part. They are advantageously fixed in their mounts by clamping. Fastening the blowing and calibration mandrels by clamping has the advantage that even deviations from the set-point outside diameter can be compensated for quite simply. Warping, as can occur in conventional screw mounts, in particular, is avoided.

One not inconsiderable advantage of the clamping mount is that it offers the capability of fixing all the blowing and calibration mandrels in their mounts with the same clamping force, regardless of any external dimensional tolerances that occur. The clamping force is selected such that the blowing and calibration mandrels cannot adjust unintentionally because of their weight and the dynamic forces involved in the processes of motion, but can be adjusted in the desired way by the action of the hydraulic forces. The blowing and calibration mandrels are preferably prevented from falling out of the upper machine part by means of stops.

A quite expedient structural variant of the clamping mount includes a retaining nut, which is provided with a male thread and can be screwed into a threaded bore in the upper machine part. The retaining nut has a conical face, which cooperates with a radially compressible clamping element, preferably a slit cone provided with a conical counterpart face and comprising an elastic, wear-resistant material, preferably of an industrial plastic. The cooperating conical faces divert the force resulting from the tightening moment of the retaining nut, and by the radial narrowing of the clamping element they assure the requisite clamping force.

Because the clamping mount includes a prestressing element, dimensional tolerances and nonuniformities in the embodiment of the thread of the threaded bore in the upper machine part and on the retaining nut can be compensated for. The prestressing element is preferably formed by a cup spring, which in the put-together state is braced on one end in the threaded bore and on the other, optionally with the interposition of an underlay shim or washer, on the clamping element. The underlay shim has the advantage that the cup spring cannot dig into the somewhat softer, radially compressible clamping element. This reliably counteracts any mispositioning of the cup spring.

The floating mounting of the blowing and calibration mandrels in the upper machine part also offers the opportunity of rotating them about their longitudinal axis, without shifting of the axial positions set. This is advantageous for instance in blowing and calibration mandrels that have a cross section other than circular in the calibration region. For example, the blowing and calibration mandrels have a calibration region of elliptical cross section.

For the sake of more easily putting blowing and calibration mandrels with calibration regions of an other than circular cross section into the correct position relative to the cavity in the blow mold, positioning means are provided in the upper machine part and on the blowing and calibration mandrels. The positioning means preferably each include circumferential knurling or teeth on the blowing and calibration mandrel and an externally actuatable adjusting pin on the upper machine part. The circumferential knurling or teeth can have either a uniform or a variable pitch, so as to adjust the blowing and calibration mandrel in predetermined and even relatively large increments. The adjusting pins serve to fix the oriented blowing and calibration mandrels in the position set.

The stop shoulders on the blowing and calibration mandrels are advantageously provided on interchangeably held cutting rings. The cutting rings have especially hardened contact faces and cutting edges, so that the pinching-off operation is effected cleanly and reliably, and the wear to the cooperating components can be kept as slight as possible. The interchangeability of the cutting rings makes simple replacement possible as needed, or simple adaptation to requirements, for instance resulting from different wall thicknesses of the preforms.

With a view to modular construction and various possibilities for use of the apparatus, it is also highly advantageous if the calibrating portion of the blowing and calibration mandrel is formed by an interchangeable calibration sleeve. The interchangeable arrangement offers the opportunity as needed of fastening calibration sleeves of relatively large diameter, or sleeves with a cross section other than circular, for instance an elliptical cross section, to the blowing and calibration mandrels in order to retrofit the apparatus quite simply to the requirements of the particular hollow body to be produced.

In a method for producing hollow bodies, in particular bottles or similar containers provided with an evacuation opening, in a hollow body blowing process, preforms extruded in a single layer or multiple layers of a thermoplastic, for instance segments of a hose, are placed in blow molds. The hollow bodies to be produced are inflated by overpressure in accordance with the cavities enclosed by the blow molds. The evacuation openings of the hollow bodies are calibrated, and parts protruding past the evacuation necks are pinched off. Finally the unmolded hollow bodies are hardened by cooling. According to the invention, the blowing and calibration mandrels, during the pinching-off operation, in which an encompassing annular shoulder on each blowing and calibration mandrel is pressed against a counterpart face on the associated blow mold, are automatically adjusted axially in height relative to their outset position, within predeterminable limits, counter to the restoring force of a coupling medium.

The automatic self-adjustment of the blowing and calibration mandrels saves the operator the inconvenient, time-consuming and in some cases potentially dangerous adjustment procedure. It suffices if the feeding device on the upper machine part is set in a single adjusting step. The automatic reregulation of the height of the blowing and calibration mandrels assures that operative faces on the encompassing annular shoulders of the blowing and calibration mandrels will all be disposed at the same height and also assures uniform imposition of pressure on the counterpart faces at the orifices of the cavities in the blow molds.

Because the blowing and calibration mandrels are short-circuited to one another by a hydraulic fluid operated in the spring range, a gentle height adjustment and in particular a damped delivery of the blowing and calibration mandrels to the associated blow molds are assured. The hydraulic short circuit causes a pressure compensation by way of the number of blowing and calibration mandrels, which is expressed in the fact that some of the blowing and calibration mandrels are adjusted in one axial direction, while the others are adjusted for compensatory purposes in the opposite direction.

The blowing and calibration mandrels are advantageously held by clamping in their floating outset position on the beamlike upper machine part. The mount is embodied releasably. A decisive factor for the pressure compensation over the entire number of blowing and calibration mandrels is that each blowing and calibration mandrel is held with the same clamping force. The clamping force is advantageously selected such that the blowing and calibration mandrels are secured against unintended falling out of their clamping mounts, while their axial height adjustability is impaired only insignificantly. It is especially advantageous if the clamping force is selected as precisely great enough that a correct self-adjustment of the axial height of the blowing and calibration mandrels once effected is maintained counter to the restoring force of the hydraulic fluid. The clamping force is defined by the tightening moment of the mounts for the blowing and calibration mandrels in the beamlike upper machine part, which can be adjusted quite simply by the operators and maintenance staff, for instance by using a suitable torque wrench. The effective value of the clamping force then depends on the structural design of the mounting device.

BRIEF DESCRIPTION OF THE DRAWINGS

The invention will be described below in terms of an exemplary embodiment shown in the drawings. In partly schematic views not to scale, the drawings show:

FIG. 1, a portion of an exemplary apparatus of the invention, with an arrangement of three blowing and calibration mandrels, in their outset position;

FIG. 2, the blowing and calibration mandrels of FIG. 1 once self-adjustment has occurred according to an exemplary embodiment;

DETAILED DESCRIPTION OF THE PREFERRED EMBODIMENTS

Figures 3, 4:
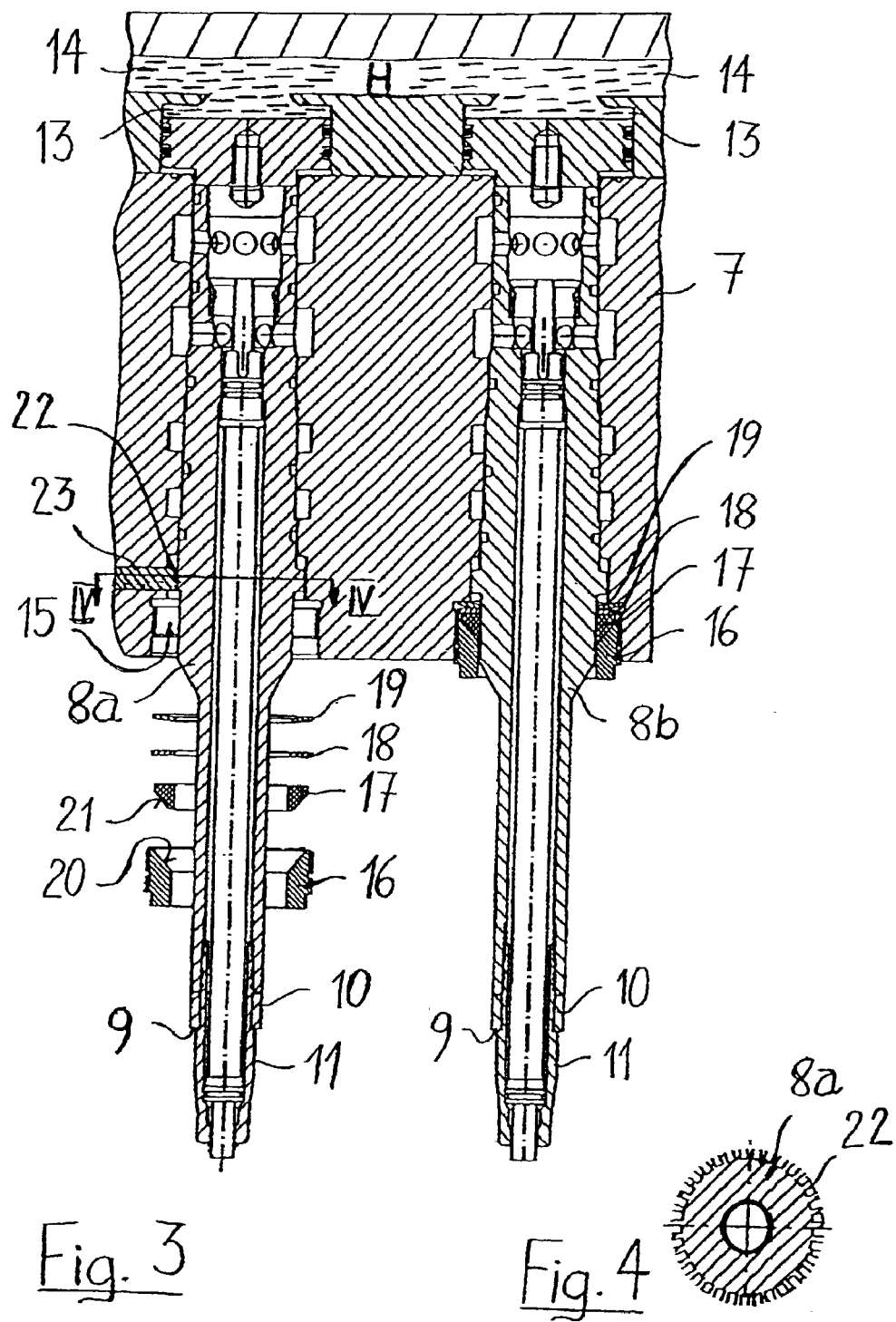
FIG. 3, an exemplary upper machine part with an arrangement of two blowing and calibration mandrels, for the sake of illustrating their floating mounting.
FIG. 4, an exemplary cross section through a blowing and calibration mandrel taken along the line IV—IV in FIG. 3.

An exemplary apparatus, embodied according to the invention, for producing hollow bodies, in particular bottles and similar containers provided with an evacuation opening, of thermoplastic is identified in its entirety in FIG. 1 by reference numeral 1. In particular, this apparatus is a so-called automatic blow molder, in which the desired hollow body is produced from a preform by inflation in a mold. The apparatus 1 includes a lower machine part 2 and a upper machine part 7. The lower machine part 2 is embodied in table-like form and is equipped with a number of blow molds, which in FIG. 1 are identified by reference numerals 3a, 3b and 3c. The blow molds 3a, 3b and 3c each enclose one cavity 4, which defines the later form of the hollow body to be produced. The cavities 4 open out to the top of the table-like lower machine part 2, where they have orifices 5 oriented toward the upper machine part 7.

A plurality of blowing and calibration mandrels 8a, 8b, 8c are mounted side by side on the upper machine part 7, which can be embodied in beamlike form. The number of blowing and calibration mandrels 8a, 8b, 8c can correspond to the number of blow molds 3a, 3b, 3c in the lower machine part 2. Each blowing and calibration mandrel is assigned precisely one blow mold in the embodiment shown. The upper machine part 7 is equipped with feeding devices, not identified by reference numeral, with the aid of which the blowing and calibration mandrels 8*a*, 8*b*, 8*c* can be axially fed jointly toward the blow molds 3*a*, 3*b*, 3*c* in such a way that they dip with their calibration regions into the orifices 5 in the blow molds 3*a*, 3*b*, 3*c*. The feeding motion continues until an encompassing annular shoulder 9 disposed on the blowing and calibration mandrels 8*a*, 8*b*, 8*c* presses with a predeterminable force against a counterpart face 6 that is provided on each of the blow molds 3*a*, 3*b*, 3*c* and that extends around the periphery of the orifice 5 of the cavity 4. In this way, material of a preform, and placed in the cavity 4, such as an inflated single- or multi-layer tube, that protrudes past the blow molds 3*a*, 3*b*, 3*c* can be pinched off.

The annular shoulders 9 in the exemplary embodiment shown are provided on cutting rings 10*a*, 10*b*, 10*c*, which are mounted interchangeably on the blowing and calibration mandrels 8*a*, 8*b*, 8*c*.

The cutting rings 10*a*, 10*b*, 10*c* can have different heights r, s, t, which are dictated for instance by production tolerances or result from different wear. The different heights r, s, t of the cutting rings 10*a*, 10*b*, 10*c* are shown somewhat exaggerated in FIG. 1, in order to illustrate the resulting effect clearly. When the annular shoulder 9 of the blowing and calibration mandrel 8*a* is already pressed against the counterpart face 6 of the associated blow mold 3*a*, the annular shoulders 9 of the other two blowing and calibration mandrels 8*b*, 8*c* are still at the spacing a and b, respectively, from the counterpart faces 6 of the associated blow molds 3*b*, 3*c*, because of the lesser heights s, t of the cutting rings 10 *b*, 10*c*. In the apparatuses of the prior art, the height of the blowing and calibration mandrels 8*b*, 8*c* therefore had to be changed in an inconvenient adjusting process, in order to compensate for different heights r, s, t of the cutting rings 10*a*, 10*b*, 10*c* and to assure secure pinching off of protruding material at all the blow molds 3*a*, 3*b*, 3*c*. In this respect it can be taken into account that automatic blow molders can have up to ten or even more blowing and calibration mandrels with associated blow molds, for the sake of producing hollow bodies on a mass-production basis and economically. With the number of blowing and calibration mandrels, the effort of adjustment naturally also increases. This means downtimes of the automatic blow molder that are multiple times longer and also means an increased risk to operators in the case of adjusting height with the machine running.

In the exemplary apparatus 1 embodied according to the invention, the blowing and calibration mandrels 8*a*, 8*b*, 8*c* each cooperate, on their respective end portion supported in the upper machine part 7, with adjusting pistons 12, which are axially displaceable to a limited extent inside bores 13 in the upper machine part 7. The bores 13 communicate with a conduit 14, which acts as a reservoir for a hydraulic fluid H, by way of which the blowing and calibration mandrels 8*a*, 8*b*, 8*c* are short-circuited. The hydraulic fluid H is put under pressure in the spring range by the axially adjusted pistons 12.

By the feeding of the blowing and calibration mandrels 8*a*, 8*b*, 8*c* against the blow molds 3*a*, 3*b*, 3*c*, the shoulders 9 are supposed to be pressed against the counterpart faces 6. As soon as the shoulder 9 of the first blowing and calibration mandrel 8*a* is pressed with a certain force against the counterpart face 6 of the associated blow mold 3*a*, the blowing and calibration mandrel 8*a* is displaced axially, and the adjusting piston 12 migrates upward. The axial displacement is effected counter to the resistance of the hydraulic fluid. The pressure transmitted to the hydraulic fluid H is distributed, because of the short circuit, to the adjusting pistons 12 of the other blowing and calibration mandrels 8*b*, 8*c*, and as a result these blowing and calibration mandrels are axially displaced more or less far compared to their outset position.

FIG. 2 shows the position of the blowing and calibration mandrels 8*a*, 8*b*, 8*c* after the self-adjustment. The blowing and calibration mandrel 8*a* with the cutting ring 10*a* having the greatest height r has been shifted to the rear, into the upper machine part 7. By the pressure exerted on the hydraulic fluid H, the blowing and calibration mandrel 8*c* with the cutting ring 10*c* having the least height t has in turn been pushed outward in the opposite direction, toward the associated blow molding mechanism 3*c*. The middle blowing and calibration mandrel 8*b* has essentially remained in the same axial position and, with the location of its annular shoulder 9, it dictates the set-point location of the other annular shoulders. The axial height adjustability of the blowing and calibration mandrels 8*a*, 8*b*, 8*c* compared to their outset position amounts for instance to about 4 mm (e.g., ±10 percent or more or less). In a variant of the invention, the axial adjustment range can be selected as about 2.5 mm. It is understood that even greater height adjustment ranges can be provided. The hydraulic fluid H has a certain elastic compressibility, which upon initiation of force via the pistons 12 brings about a certain damping.

FIG. 3 shows a portion of the upper machine part 7 with two of the blowing and calibration mandrels 8*a*, 8*b*, preferably disposed in series, on a larger scale. Identical components have the same reference numerals as in FIGS. 1 and 2. The blowing and calibration mandrel 8*a* on the left is shown taken apart, to clearly illustrate the structure of its floating mounting. On the blowing and calibration mandrel 8*b* on the right, the elements of its mount are shown in the assembled state. In the exemplary embodiment shown, the blowing and calibration mandrels 8*a*, 8*b* are secured to the beamlike upper machine part 7 by a clamping mount such that they float with limited axial displaceability. The clamping mount comprises a retaining nut 16, which is provided with a male thread and can be screwed into a threaded bore 15 in the upper machine part 7. The retaining nut 16 cooperates via a conical face 20 with a radially compressible clamping element 17. The clamping element 17 is preferably a slit cone of an elastic, wear-resistant material, for instance an industrial plastic. The cone is equipped with a counterpart face 21. The retaining nut 16 and the clamping element 17 are kept prestressed by a cup spring 19, which is braced on one end in the threaded bore 15 and on the other on an underlay shim 18 placed between the cup spring 19 and the clamping element 17.

The retaining nut 16 is screwed with a predetermined tightening moment into the threaded bore 15. A torque wrench is used for the purpose, for instance. The clamping force transmitted to the blowing and calibration mandrels 8*a*, 8*b* depends on the force boost by the conical faces 20, 21 and the dimensions of the clamping element 17. The effective clamping force also depends on the coefficients of friction of the cooperating faces of the blowing and calibration mandrels 8*a*, 8*b* and clamping elements 17. In each case, the clamping force should be at least great enough that the blowing and calibration mandrels 8*a*, 8*b* do not fall out of their mounts on the upper machine part 7 but instead continue to be held in floating fashion. Advantageously, the clamping force is precisely great enough that the automatic axial adjustment of the blowing and calibration mandrels 8*a*, 8*b* is not significantly hindered by the hydraulic forces that occur upon feeding toward the lower machine part. On the other hand, the clamping force suffices to prevent the blowing and calibration mandrels 8a, 8b from shifting unintentionally because of their weight and the dynamic forces involved in the movement processes. The tightening moment for the retaining nut 16 is dependent directly on the cone angle selected. As a result, a frictional force that is greater than the forces of inertia and that nevertheless still allows displacement of the blowing and calibration mandrels 8a, 8b by the reaction force in the pinching process is the goal. In a variant of the invention, the tightening moment is selected for instance as about 20 Nm to about 40 Nm, and preferably about 25 Nm to 35 Nm, and especially preferably about 31 Nm.

The calibration region at the front of the blowing and calibration mandrels 8a, 8b, in the exemplary embodiment shown, is embodied in each case by a calibration sleeve 11 mounted interchangeably, for instance being screwed in. As a result, this sleeve can easily be taken out as needed and replaced. The cutting rings 10 are also interchangeably mounted and are braced on a free front end of the blowing and calibration mandrel 8a, 8b and on a shoulder on the circumference of the calibration sleeve 11.

Because of the floating mounting of the blowing and calibration mandrels 8a, 8b, the possibility also exists as needed of mounting calibration sleeves 11 with an other than circular cross section, for instance elliptical calibration sleeves, and orienting them quite simply with the cavities in the blow molds, so that in particular the axes of the blowing and calibration mandrels 8a, 8b match the axes of the necks of the cavities. To that end, positioning means are provided, which enable a controlled rotation of the blowing and calibration mandrels about their longitudinal axis. The positioning means include an adjusting pin 23 in the upper machine part 7, which cooperates with circumferential knurling or external teeth 22 on the blowing and calibration mandrels 8a, as shown in suggested fashion in FIG. 4. The circumferential knurling or teeth 22 can have either a uniform or a nonuniform pitch, so that the blowing and calibration mandrels 8a can be adjusted in rotated fashion in predetermined and even relatively large increments. The adjusting pin 23 serves to fix the oriented blowing and calibration mandrel 8a in the position set.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An apparatus for producing a hollow body, of thermoplastic, comprising:
a lower machine part that has at least two blow molds each provided with a cavity, and beamlike upper machine part, disposed above the lower machine part, on which upper part a number of blowing and calibration mandrels corresponding to the number of blow molds is disposed, each being associated with one blow mold and being jointly feedable toward the blow molds axially and being movable with their calibration region into an orifice of the cavities until an annular shoulder of the blowing and calibration mandrels comes into contact with a counterpart face of the blow molds, the blowing and calibration mandrels being retained in the upper machine part axially freely movably within predeterminable limits, and upon feeding of the blowing and calibration mandrels toward the blow molds, the blowing and calibration mandrels being automatically adjustable in height axially relative to an outset position, counter to resistance of a coupling medium.

2. The apparatus of claim 1, wherein the blowing and calibration mandrels are coupled hydraulically to one another.

3. The apparatus of claim 2, wherein the blowing and calibration mandrels cooperate with adjusting pistons, which are limitedly axially displaceable in the upper machine part inside bores and are short-circuited to one another by a hydraulic fluid, which forms the coupling medium, disposed inside a reservoir that communicates with the bores.

4. The apparatus of claim 3, wherein an axial height adjustability of the blowing and calibration mandrels relative to the outset position amounts to about ±4 mm.

5. The apparatus of claim 4, wherein the blowing and calibration mandrels are retained by a clamping force of a clamping mount in the beamlike upper machine part and are releasably fixed.

6. The apparatus of claim 1, wherein an axial height adjustability of the blowing and calibration mandrels relative to the outset position amounts to about ±4 mm.

7. The apparatus of claim 1, wherein the blowing and calibration mandrels are retained by a clamping force of a clamping mount in the beamlike upper machine part and are releasably fixed.

8. The apparatus of claim 7, wherein the blowing and calibration mandrels are fixed in their mounts essentially with the clamping force.

9. The apparatus of claim 8, wherein the clamping mount for the blowing and calibration mandrels includes a retaining nut, which can be screwed into a threaded bore on the upper machine part and which has a male thread, which cooperates via a conical face with a radially compressible clamping element formed as a slit cone of an elastic and wear-resistant material with preferably an industrial plastic, that is provided with a conical counterpart face.

10. The apparatus of claim 9, wherein the clamping mount includes a prestressing element, which is preferably formed by a cup spring which, upon assembly, is braced on one end in the threaded bore and on the other, with the interposition of an underlay shim, on the clamping element.

11. The apparatus of claim 1, wherein the blowing and calibration mandrels are retained rotatably about their longitudinal axis in the upper machine part.

12. The apparatus of claim 11, wherein for rotating each blowing and calibration mandrel about its longitudinal axis, positioning means are provided, which include circumferential knurling or teeth on the blowing and calibration mandrels and an adjusting pin on the upper machine part that is actuatable from outside.

13. The apparatus of claim 1, wherein the shoulder on each blowing and calibration mandrel is provided on an interchangeably mounted cutting ring.

14. The apparatus of claim 1, wherein each calibrating portion of the blowing and calibration mandrels is formed by an interchangeable calibration sleeve.

15. The apparatus of claim 1, wherein the hollow body is a
container provided with an evacuation opening.

16. The apparatus of claim 1, wherein an axial height adjustability of the blowing and calibration mandrels relative to the outset position amounts to about ±2.5 mm.

17. A method for producing hollow bodies in a hollow body blowing process, comprising:
placing preforms extruded in a single layer or multiple layers of a thermoplastic in blow molds;

simultaneously inflating by means of a blowing and calibration mandrel assigned to each blow mold, the preforms by overpressure cavities enclosed by the blow molds;

calibrating evacuation openings of the hollow bodies;

pinching off parts protruding past the evacuation necks during a pinch-off operation, wherein the blowing and calibration mandrels, during the pinching-off operation, in which an annular shoulder on each blowing and calibration mandrel is pressed against a counterpart face on the associated blow mold, are automatically adjusted axially in height relative to an outset position, within predeterminable limits, counter to a restoring force of a coupling medium;

hardening the hollow bodies by cooling.

18. The method of claim 17, comprising:

effecting an axial height adjustment of the blowing and calibration mandrels such that the pressure exerted by each annular shoulder on the associated counterpart face is of equal magnitude.

19. The method of claim 17 comprising:

operating a hydraulic fluid operated in the spring range by which the blowing and calibration mandrels are short-circuited to one another, for use as the coupling medium.

20. The method of claim 17, comprising:

retaining the blowing and calibration mandrels are retained by clamping in a mount of a beamlike upper machine part of an automatic blow molder, each blowing and calibration mandrel being held with the same clamping force.

21. The method of claim 20, the clamping force such that the blowing and calibration mandrels are secured against displacement from their weight and dynamic forces in movement processes, adjustments being in response to hydraulic forces.

* * * * *